No. 750,329. PATENTED JAN. 26, 1904.
N. N. WINDINGSTAD.
CORN SHREDDER.
APPLICATION FILED OCT. 31, 1902.
NO MODEL.
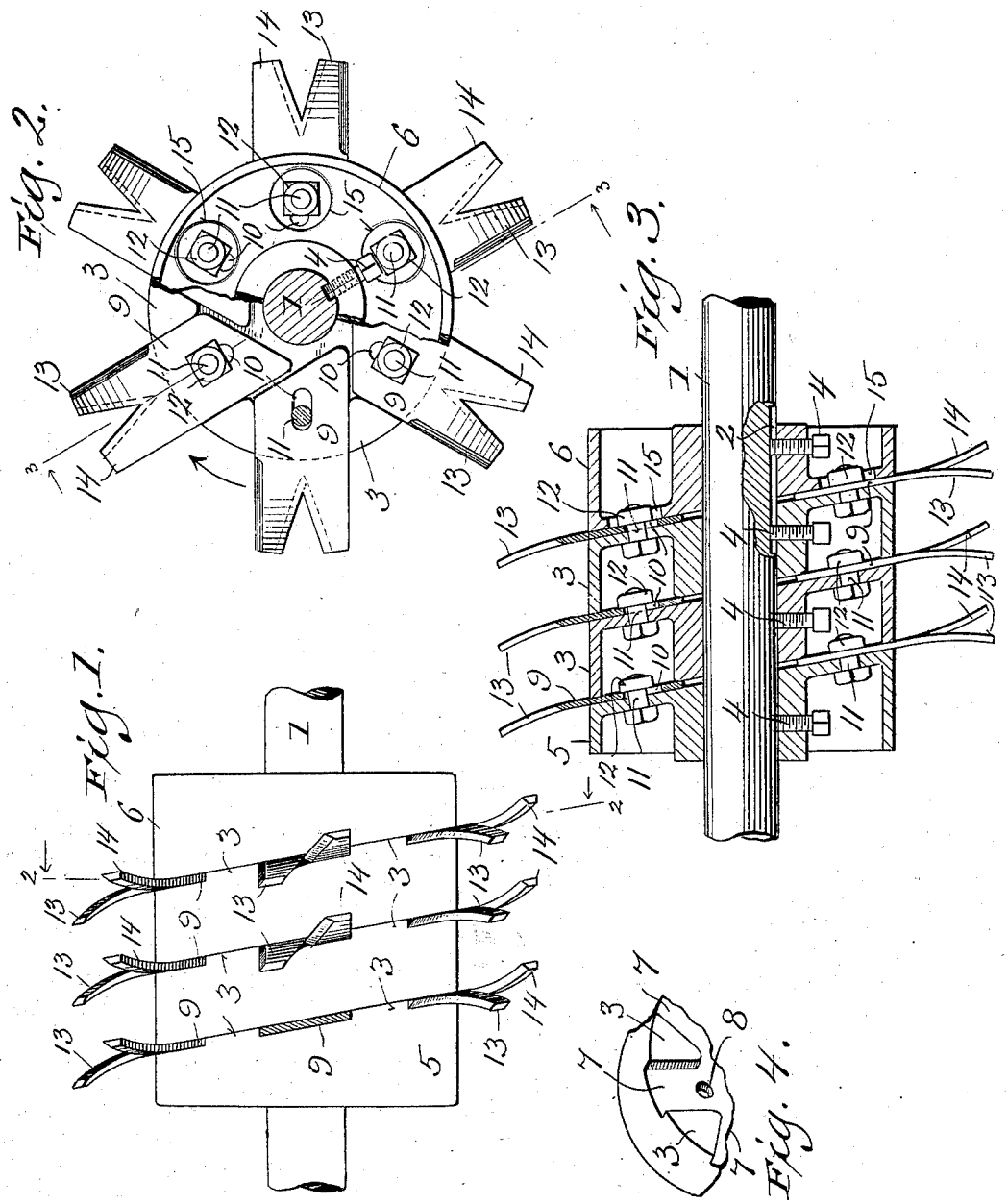

No. 750,329. Patented January 26, 1904.

UNITED STATES PATENT OFFICE.

NELS N. WINDINGSTAD, OF MANITOWOC, WISCONSIN, ASSIGNOR TO SMALLEY MANUFACTURING COMPANY, OF MANITOWOC, WISCONSIN.

CORN-SHREDDER.

SPECIFICATION forming part of Letters Patent No. 750,329, dated January 26, 1904.

Application filed October 31, 1902. Serial No. 129,622. (No model.)

*To all whom it may concern:*

Be it known that I, NELS N. WINDINGSTAD, a citizen of the United States, and a resident of Manitowoc, in the county of Manitowoc and State of Wisconsin, have invented certain new and useful Improvements in Corn-Shredders; and I do hereby declare that the following is a full, clear, and exact description thereof.

My invention relates to cylinders for shredding cornstalks; and it consists in certain peculiarities of construction and combination of parts, as will be fully set forth hereinafter in connection with the accompanying drawings and subsequently claimed.

In the said drawings, Figure 1 is a representation in side elevation of a portion of a shredding-cylinder embodying my said invention. Fig. 2 is an end view, partly in section, on the line 2 2 of Fig. 1, so as to show part of the plate of one of the shells next the adjacent end collar. Fig. 3 is a longitudinal sectional view, taken on the line 3 3 of Fig. 2. Fig. 4 is a perspective view of a detail of construction.

Referring by numerals to the drawings, 1 designates the shaft of the cylinder, the ends of said shaft (not shown) being supported in the shredding-machine in any suitable manner and said shaft being formed with a longitudinal exterior groove 2. To this shaft are fitted any desired number of oblique cylindrical shells 3 3, according to the length of the shaft, two only of such shells being shown in the present drawings, said shells being held to place by means of set-screws 4 4, passing through bores tapped in their hubs and entering the described groove 2, as best shown in Fig. 3. On each end of the shaft is a collar having a straight outer and oblique inner end, the collar 5 at one end carrying cutting-blades like the intermediate shells 3 3, while the collar 6 at the other end is free from such blades, but both collars being exteriorly cylindrical, like the said shells. Each shell 3 (and the collar 5) is formed with a hub and a continuous oblique plate at one end, said plate being formed with a series of radially-disposed flat-faced depressions or recesses 7 7 (six of these recesses being indicated in the present illustration, that being found a desirable number in practice) and there being a bolt-hole 8 through the bottom of each recess.

9 9 represent the shanks or inner ends of the cutting-blades, and these shanks are flat and fit in the said recesses so as to be flush with the oblique end plates of the shells, the said shanks having oblong slots 10 therethrough, so as to be adjustably secured within the said recesses by means of bolts 11, passing through the holes 8 in the shell-plates and the said slots 10, and by nuts 12 on said bolts, each shank 9 having two cutting-blades 13 14, which curve in opposite directions, the blades 13 bending back of the lines of the shell-plates and the blades 14 bending forward of the same, as shown.

The hubs of the collars 5 and 6 are secured to the shaft 1 by means of set-screws 4, projecting into the described longitudinal groove 2, just as with the shells 3 3, and the collar 6 has an inner oblique end plate formed with a series of holes 15 15 therethrough to receive the bolt ends and nuts secured to the oblique plate of the adjacent shell.

The operation of my device will be readily understood from the foregoing description of its construction, taken in connection with the accompanying drawings. By reason of the divergent cutting-blades the cornstalks are more quickly and thoroughly shredded than with the old style of saw-disks in common use. Further, by reason of the described slotted construction of the shanks 9 the said blades can be projected outward when required to compensate for wear or otherwise, and said blades can be readily and individually removed when necessary for repair or sharpening, while on account of the described continuous cylindrical contour of the assembled shells coming up close to the operative inner ends of the cutting-blades the former objectionable winding of the stalks around the shaft of the shredding-cylinder is wholly done away with, and hence much loss of time in removing the stalks thus wrapped around the cylinder is obviated.

Having thus described my invention, what I claim as new, and desire to secure by Letters Patent, is—

In a corn-shredder, the combination with a shaft, of a series of oblique cylindrical shells, secured thereto, and a series of independently-movable cutting-blades whose shanks are adjustably secured to said shells, each blade having one shank and two divergent cutting ends, projecting beyond the cylindrical surface of said shells, one cutting end of each blade being bent or curved back of the line of the shell-plate to which its shank is secured, and the other cutting end being bent or curved forward of said line.

In testimony that I claim the foregoing I have hereunto set my hand, at Manitowoc, in the county of Manitowoc and State of Wisconsin, in the presence of two witnesses.

NELS N. WINDINGSTAD.

Witnesses:
JULIUS HENDRICKSON,
VLASTA STUPECKY.